United States Patent [19]

Bond et al.

[11] Patent Number: 5,119,489
[45] Date of Patent: Jun. 2, 1992

[54] METHOD OF MONITORING THE BRING UP OF ALL UNITS IN A MULTIPLE SYSTEM FROM A REMOTE UNIT INCLUDING DIAGNOSTIC TESTING WITH VISUAL INDICATOR ILLUMINATION INDICATING OPERABILITY

[75] Inventors: Arthur L. Bond; David R. Hughes, both of Raleigh; Hollis P. Posey, Cary; Arthur M. Wiencken, Jr., both of Raleigh, all of N.C.

[73] Assignee: International Business Machines Corporation, Armonk, N.Y.

[21] Appl. No.: 134,556

[22] Filed: Dec. 15, 1987

Related U.S. Application Data

[63] Continuation of Ser. No. 782,749, Oct. 2, 1985, abandoned.

[51] Int. Cl.⁵ .............................................. G06F 11/22
[52] U.S. Cl. .................................. 395/575; 364/267.7; 371/29.1
[58] Field of Search .................... 371/29, 29.1; 364/200 MS File, 141; 340/825.17

[56] References Cited

U.S. PATENT DOCUMENTS

| | | | |
|---|---|---|---|
| 3,529,293 | 9/1970 | Sullivan et al. | 340/825.17 |
| 3,634,824 | 1/1972 | Zinn | 340/825.17 |
| 3,659,273 | 4/1972 | Knauft et al. | 371/29 |
| 4,204,249 | 5/1980 | Dye et al. | 364/200 |
| 4,251,858 | 2/1981 | Cambigue et al. | 340/825.17 |
| 4,424,576 | 1/1984 | Lange | 364/900 |
| 4,495,568 | 1/1985 | Gilbert et al. | 364/200 |
| 4,519,025 | 5/1985 | Fayette | 364/141 |
| 4,521,885 | 6/1985 | Melock et al. | 371/29 |
| 4,628,478 | 12/1986 | Henderson | 364/900 |
| 4,633,469 | 4/1984 | Kishi | 371/29 |
| 4,695,946 | 9/1987 | Andereasen et al. | 364/200 |

FOREIGN PATENT DOCUMENTS

| | | | |
|---|---|---|---|
| 0181757 | 3/1983 | Japan | 340/825.17 |
| 0164264 | 9/1985 | Japan | 340/825.07 |
| 8400651 | 2/1984 | PCT Int'l Appl. | 340/825.07 |

OTHER PUBLICATIONS

*IBM Technical Disclosure Bulletin*, vol. 19, No. 8, Jan. 1977 "Diagnostic Error Display", pp. 2865-2866.

Primary Examiner—Lawrence E. Anderson
Attorney, Agent, or Firm—Joscelyn G. Cockburn

[57] ABSTRACT

A procedure for bringing-up and/or establishing the operability of a distributive data processing system comprises the steps of providing, at each terminal of said system, a display having a plurality of individually activatable indicators and/or indicia configured in a predetermined geometrical pattern with the position in the pattern and the electrical state of each indicator being representative of the operational readiness of an assigned terminal; running a series of operational tests in each terminal and selectively enabling the indicator and/or displaying an alphanumeric character representing said terminal on the successful completion of the operability tests.

7 Claims, 10 Drawing Sheets

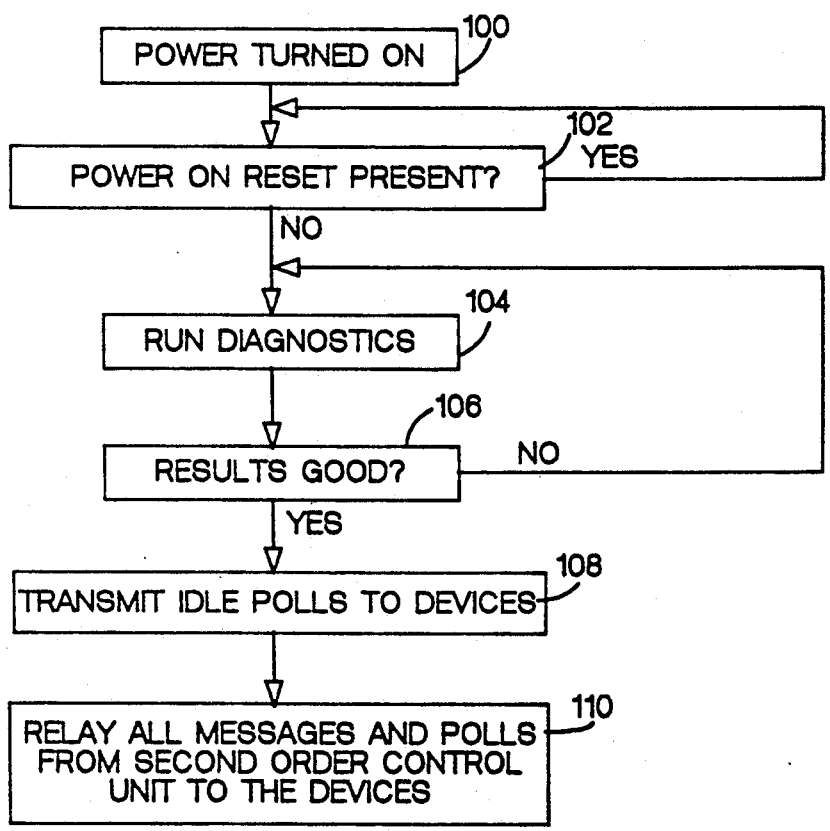

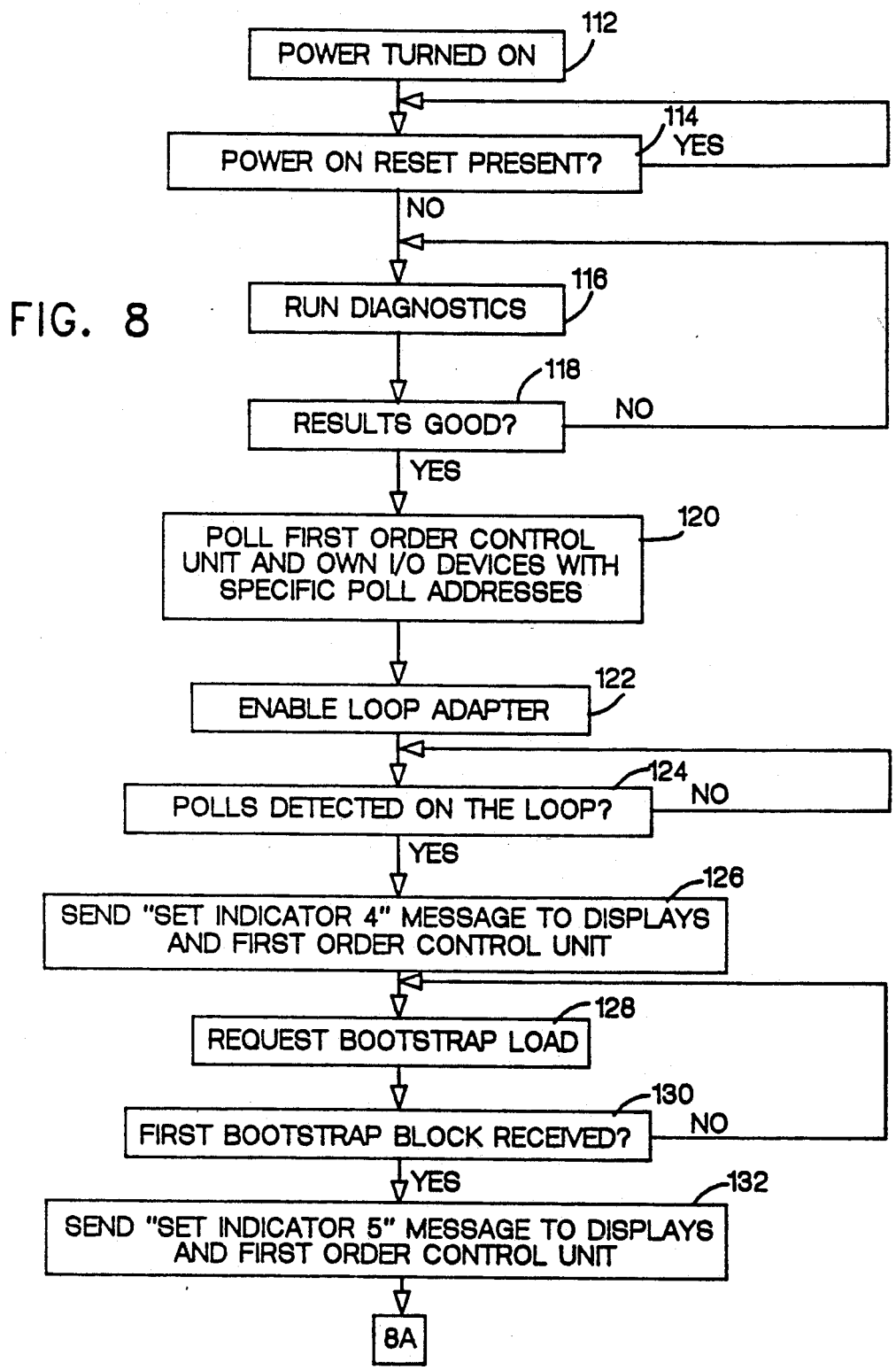

METHOD OF MONITORING THE BRING UP OF ALL UNITS IN A MULTIPLE SYSTEM FROM A REMOTE UNIT INCLUDING DIAGNOSTIC TESTING WITH VISUAL INDICATOR ILLUMINATION INDICATING OPERABILITY

This is a continuation of co-pending U.S. application Ser. No. 06/782,799 filed Oct. 2, 1985, now abandoned.

BACKGROUND OF THE INVENTION

1. Field of the Invention

The present invention relates to testing in general and more particularly to the testing and reporting on the operability and/or readiness of units within a computing installation.

2. Prior Art

The use of computing systems for gathering, processing and disseminating information is well known in the prior art. A typical computing system consists of several sub-systems coupled through a communications network to a host computer. Depending on the type of computing system, the intelligence may reside at the main computer or is shared with the sub-systems. Whether the system's intelligence is in the main computer or is shared with the sub-systems, the operability of the overall system is of maximum importance to a user since most business data and records are stored in the system and failure in the system prevents a user from retrieving needed information and/or processing new information.

In order to establish and/or maintain the operability of a computing system, the prior art has set forth several testing techniques and devices. Examples of the prior art techniques and/or devices are described in U.S. Pat. No. RE30037; 4,034,195; 4,280,285; 4,270,178; 4,414,669 and 4,464,722. The general approach is to test the operability of remote units and/or sub-assemblies from the central controller.

Although the prior art approaches are satisfactory for their intended purposes, there are several situations in which it is desirable to test the sub-systems and/or remote units at the respective sub-system and/or remote unit level without relying on the assistance of the central controller. The ability to test the system's operability at the unit and/or sub-system level is of particular importance where the sub-systems and/or units may be placed at different locations within an establishment and the units are not necessarily within sight of each other.

SUMMARY OF THE INVENTION

It is a general object of the present invention to provide an improved and more efficient technique for testing the operability of a computing system.

A more specific objective of the present invention is to provide a technique whereby remote units and/or sub-assemblies are tested without relying on the central controller.

Yet another specific objective is to provide information relative to the readiness of a remote central and/or other controller at the unit and/or sub-assembly level.

The testing procedure also includes a feedback routine wherein a user or an operator is being informed of the system's operability and the areas where problems are likely to be present. To this end, the computing system is categorized into a hierarchical structure. Placement into a category depends on the quantum of intelligence associated with that unit or sub-assembly. The controller is placed in the highest level of the hierarchy and is called a "third order control unit" while the keyboard units and display units are placed in the lowest level of the hierarchy. Sub-assemblies such as terminals, etc. are classified as "first or second order control units."

A keyboard and a display unit are both coupled to the first, second and third order control units. An indicating zone is provided on each keyboard and on each display unit. The zone is fitted with a plurality of side-by-side indicia and/or indicators. Each position of the indicia correlates with a unit of the hierarchy. To this end the first position of the indicating zone correlates with the display unit. A "1" in that position indicates that the display unit is operational. Similarly, a "2" in the second position indicates that the first order control unit is operational. A "3" in the third position indicates that the terminal is operational and so on.

One feature of the invention informs a user when software products are successfully downloaded into lower order devices. To facilitate this feature indicators are placed at higher order positions of the indicating zone. As a downloading event is concluded a corresponding indicia is activated. Failure to activate an assigned digit and/or indicator indicates that the assigned routine has failed and/or the assigned device is non-operational.

The foregoing and other features and advantages of this invention will be more fully described in the accompanying drawings.

DESCRIPTION OF THE DRAWINGS

FIG. 7 shows a flow chart for the "bring-up" routine in a first order control unit.

FIGS. 8 and 8A show a flow chart for the bring-up routine in a second order control unit.

DETAILED DESCRIPTION OF THE PREFERRED EMBODIMENT

Although the present invention, to be described hereinafter, can be adapted for use in any type of computer system, it works well in a computing system adapted for use in a retail establishment, department store, etc., and as such will be described in that environment. Such special purpose computing systems are hereinafter referred to as point of sale terminal systems. However, this should not be construed as a limitation on the scope of the present invention since it is well within the skill of one skilled in the art to adjust the invention to work with any computing system.

Figure 1:
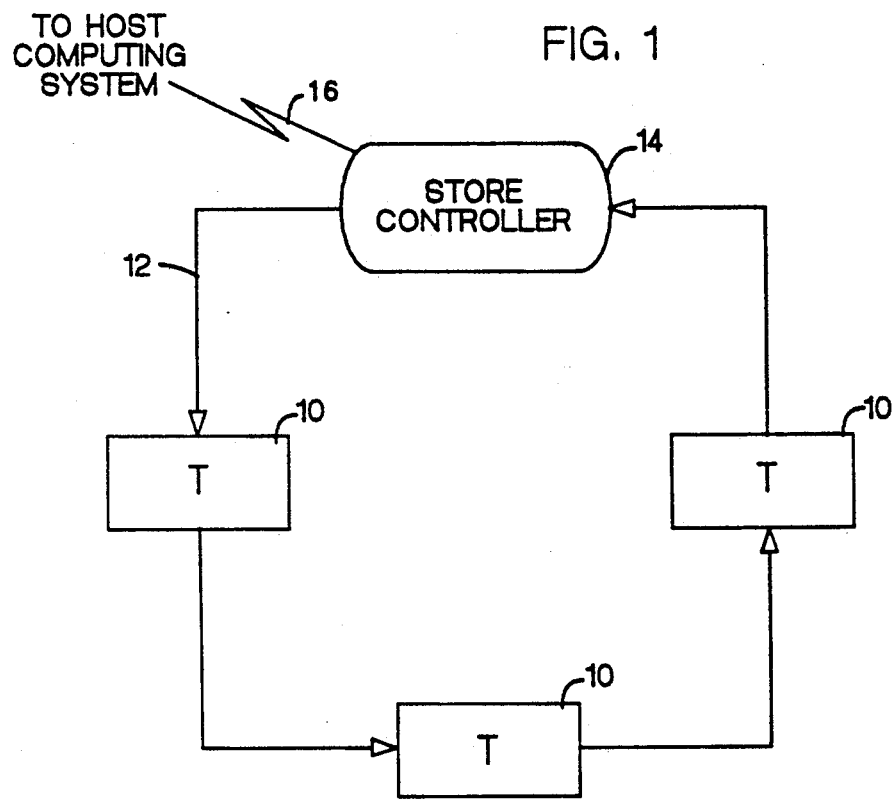
FIG. 1 shows a block diagram of a distributed computer system suitable for utilizing the present invention.

FIG. 1 shows a block diagram for a point of sale computing system. The system includes a plurality of terminals identified by numeral 10 and coupled through a communications medium 12 to a store controller 14.

The store controller is coupled through a communication link 16 to a host computer (not shown). As can be seen from the figure, the communications medium is configured into a loop. Messages on the loop flow in a unidirection identified by the arrow. In this type of configuration the terminals are used to tally sales transactions while the store controller performs data collection functions, price files and store management functions.

Figure 2:
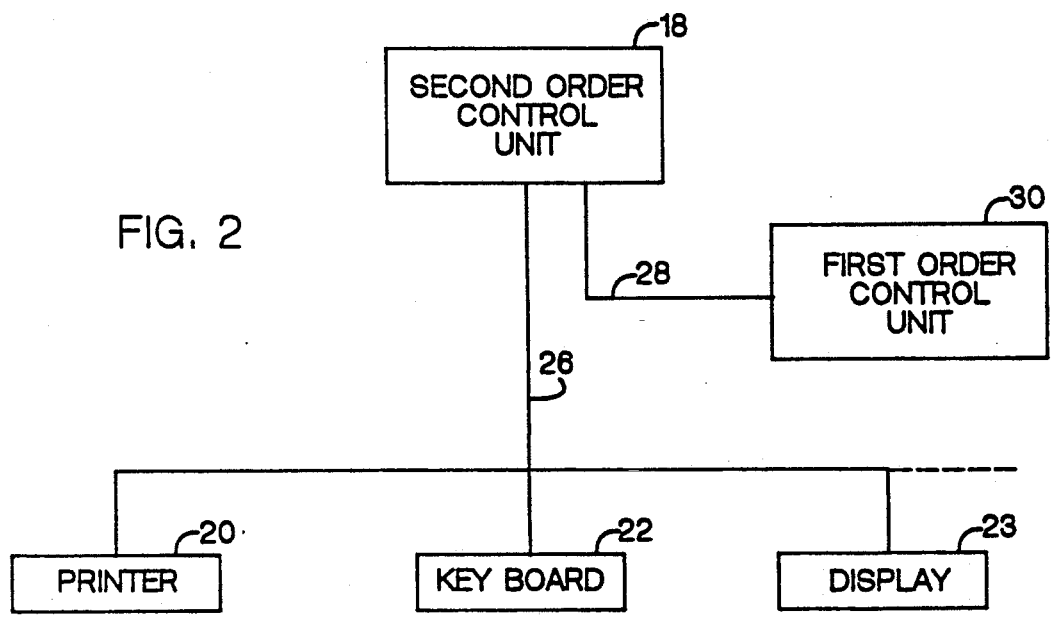
FIG. 2 shows a block diagram of a first and second order control unit.

FIG. 2 shows a block diagram of the components which can be located in terminal 10. The components include a second order control unit identified by numeral 18 and a plurality of I/O devices identified by numerals 20, 22, 23, etc. The I/O devices are connected by a serial I/O channel 26 to the second order control unit 18. Each of the I/O devices 20-23 is coupled over respective conductors to the serial I/O channel 26. Similarly, a conductor identified by numeral 28 interconnects a first order control unit 30 to the second order control unit 18. Although not shown, a similar set of I/O devices (20-23) is connected to the first order control unit 30. The cables or conductors supply both power and control signals from the control units to the I/O devices. Of these devices and for purposes of the present invention, only the keyboard and operator display are mandatory for practicing the present invention. It should be noted that the electrical signals can be distributed by means other than cables or conductors. For example, optical fibers, infrared links, etc. can be used to distribute the electrical signals.

In order to provide a logical framework within which an operator or user can identify the operability of a unit within the installation, the units are categorized within a hierarchical structure. In this structure the lowest order devices are the keyboard and display. The other components in the hierarchy recited in ascending order of importance are first order control unit 30, second order control unit 18, and third order control unit 14 which is the store controller.

In this configuration the first order control unit 30 is attached to the second order control unit 18 which in turn is attached to the third order control unit 14 over communications line 12. The second order control unit 18 is dependent on the third order control unit 14 for its operating system and application programs. The application programs and operating system are software which are downloaded into the terminal and allow it to interact with an operator through the keyboard and operator display. In this configuration the first order control unit 30 is totally dependent on the second order control unit 10 for operating instructions, data processing, etc. In essence, the first order control unit 30 only supplies power to its attached I/O devices (not shown) and executes limited diagnostics (to be described subsequently) at power-on time.

As stated previously, of the I/O devices only the keyboard and display are needed for indicating the operability of the control unit following a bring-up cycle. As is used in this application, the term "bring-up" means the series of process steps that a device and/or sub-system must cycle through from power-on until it is ready for processing data.

Figure 3:
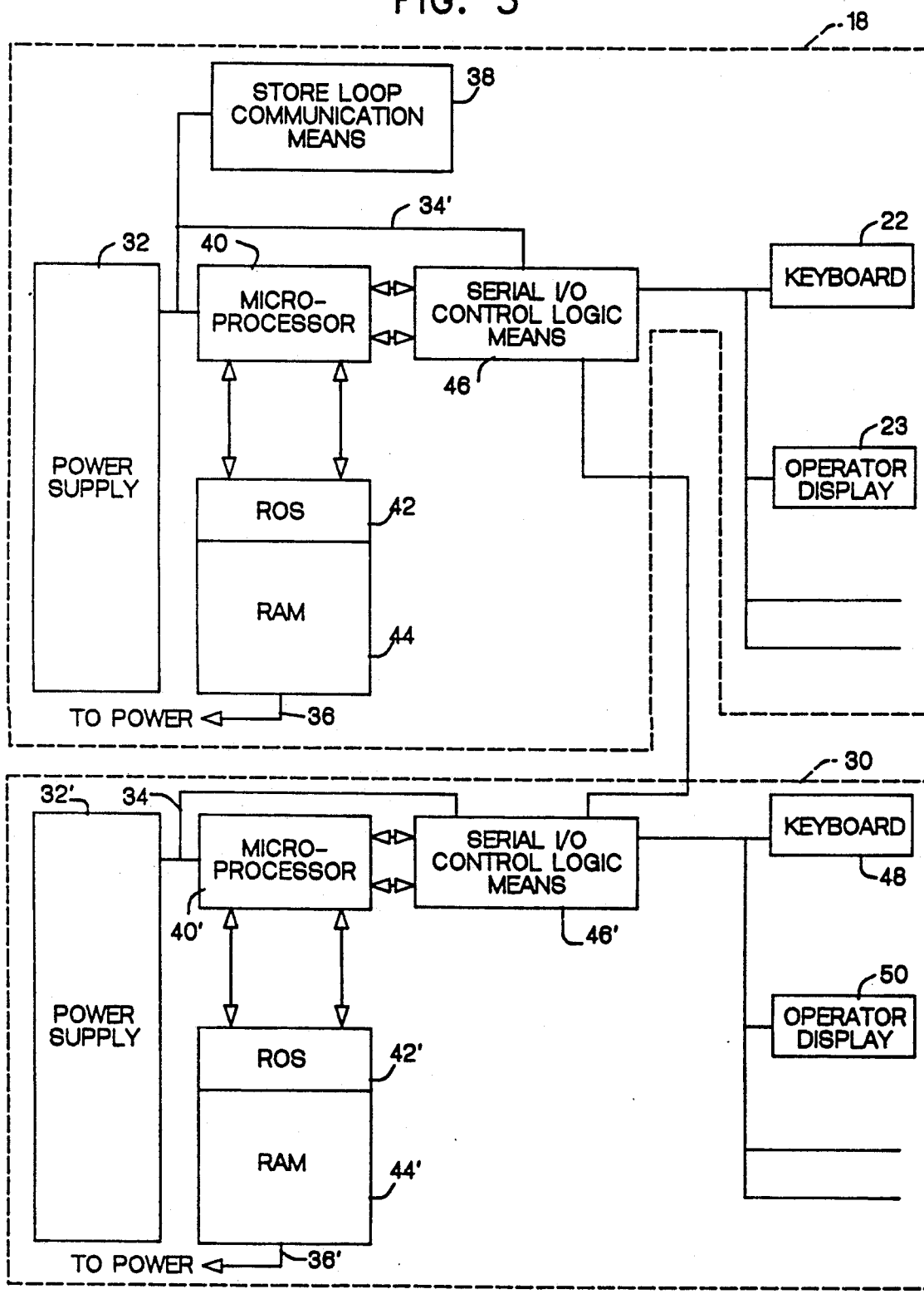
FIG. 3 shows a functional block diagram for a second order control unit and a first order control unit.

FIG. 3 shows a functional block diagram for first order control unit 30 and second order control unit 18. Elements which are common to previously-identified elements in FIGS. 1 and 2 will be identified by common numerals. To this end keyboard 22 and display 23 are coupled over respective cables to I/O channel 26. Likewise, conductor 28 couples first order control unit 30 to second order control unit 18. Still referring to FIG. 3, each of the second order control units 18 and the first order control units 30 contains a power supply identified by numerals 32 and 32', respectively. The function of the power supply is to provide power for the microprocessor and devices and to generate a control signal, "power on reset" pulse, on conductors 34 and 34' respectively. At power on time the power on reset pulse initializes all control logic and the microprocessor. The application and removal of the "power on reset pulse" cause the microprocessor of each unit to perform a diagnostic check of all components, and if successful, to start communicating with its subordinate device and its higher order unit. It is the testing and reporting of the results that form the key feature of this invention. For notifying the operator, the results of the test are made known by activating sequentially placed indicia on the operator display screen and activating a bank of indicators placed (to be described later) on the keyboard.

Still referring to FIG. 3, power into the supplies 32 and 32', respectively is supplied from a power outlet (not shown) over conductors 36 and 36', respectively. The output from power supply 32 is fed over respective conductors to store loop communication means 38 and microprocessor 40. The function of store loop communications means 38 is to interface the terminal with loop 12 (FIG. 1). It also extracts and inserts messages from the terminal onto the loop. The microprocessor 40 represents the intelligence in the second order control unit 18. It also performs the necessary logical and arithmetical functions that are needed for proper operation of the terminal. The output of microprocessor 40 is coupled to a read-only storage (ROS) identified by numeral 42 and a random access memory (RAM) identified by numeral 44. The ROS and RAM store programs and instructions which are needed for running in the microprocessor. The microprocessor 40 is also coupled to serial I/O control logic means 46. The function of the serial I/O control logic means 46 is to prepare messages which are outputted on the serial I/O channel 26 and channel 28 for the attached devices and/or the first order control unit 30.

The first order control unit 30 may include a microprocessor identified by numeral 40', a ROS identified by numeral 42', a RAM identified by numeral 44', a serial I/O control logic means identified by numeral 46', a keyboard identified by numeral 49 and an operator display identified by numeral 50. The keyboard and display are coupled by appropriate conductors to the serial I/O control logic means 46'. The enunciated devices of first order control unit 30 function in the same manner as those previously described in accordance with the second order control unit 18. Therefore, for brevity a description of their operation will not be repeated.

Figure 4:
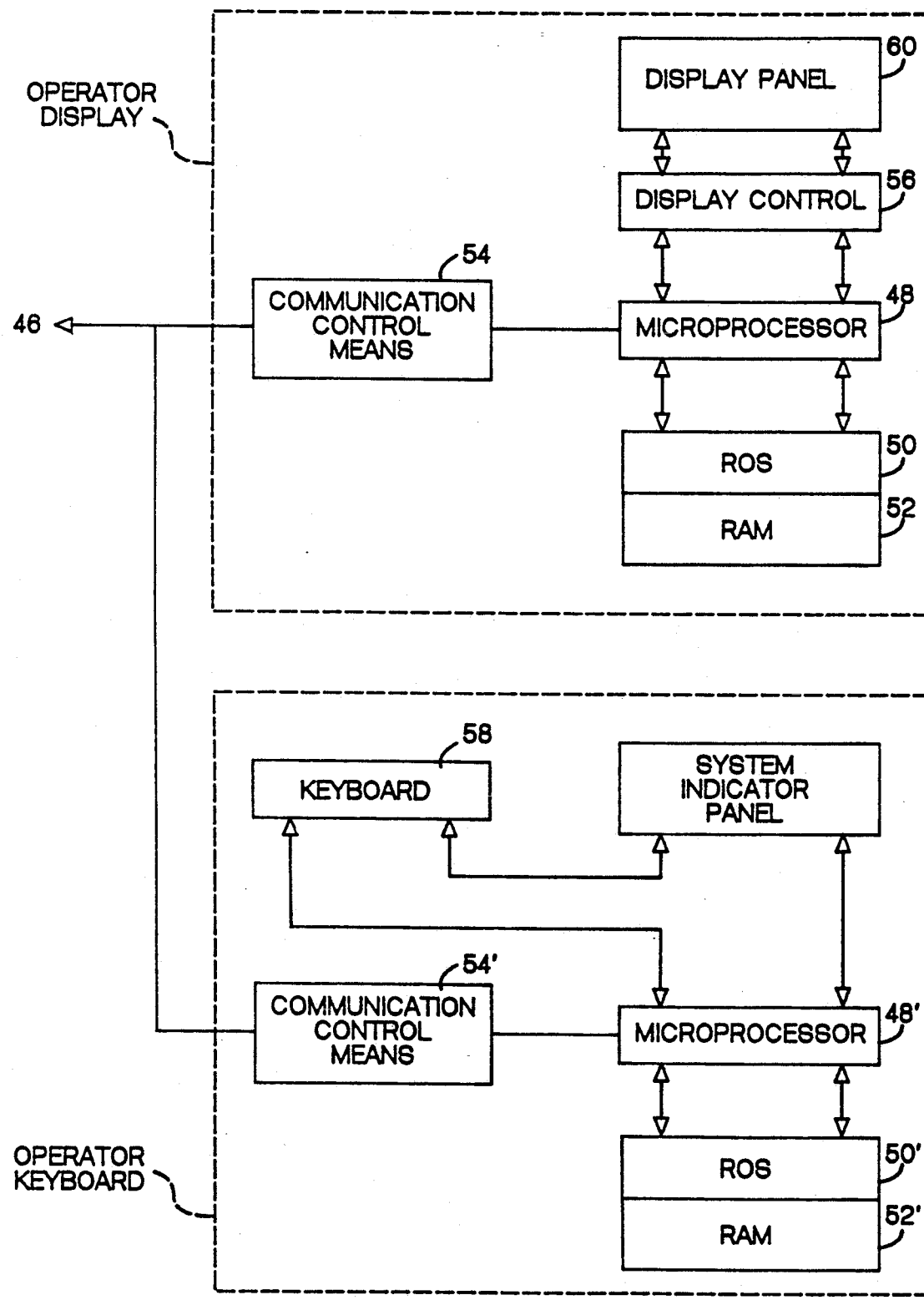
FIG. 4 shows a functional block diagram for a keyboard unit and a display unit.

FIG. 4 shows a functional block diagram for an operator keyboard and an operator display. Both the keyboard and the display are needed for carrying out the teachings of the present invention. Of course, any two mutually non-dependent output units can be used. The keyboard and the display are connected via conductor 46 to a control unit within the hierarchical system. For example, a keyboard and a display are connected to first order control unit 30, second order control unit 18, and third order control unit 14 (FIGS. 1, 2 and 3) The operator displays and operator keyboards which are connected to first order control unit 30 and second order control unit 18 are microprocessor controlled devices. Of course, other types of controllers other than microprocessors can be used for controlling the keyboard and display, respectively. Each of the devices (that is, the display and keyboard) comprises a microprocessor identified by numerals 48 and 48', read-only storage (ROS) 50 and 50', random access memory (RAM) 52 and 52', respectively, communication control means 54 and 54', respectively, and the unique device (that is, keyboard 58 and display panel 60). The enunciated components (that is, communication control means, display panel, keyboard, etc.) for each device are coupled together by appropriate conductors. The conductors and the method of coupling are clearly shown in the figure and in order to minimize the size of the application the coupling arrangement will not be described.

In terms of functional characteristics the microprocessors are the intelligent units in the keyboard and the operator display. To this end messages which are transmitted from the terminal are processed through the communication controller by the microprocessor. The microprocessor is a stored program device and the microcode for running the microprocessor resides in the ROS. Similarly, the random access memory is used for storing temporary information.

Still referring to FIG. 4, in addition to the previously-enunciated components, the operator keyboard includes a system indicator panel. The system indicator panel is connected through appropriate conductors to microprocessor 48' and the keyboard 58. As will be explained subsequently, the function of the system indicator panel is to indicate the status or readiness of the operator keyboard to the operator. To this end, four independently activated light-emitting diodes (LEDs) are fabricated on the system indicator panel. Although not shown, the four LEDs on the keyboard are arranged in juxtaposition and are labeled as follows:

1) WAIT
2) OFF-LINE
3) MESSAGE PENDING
4) RESERVE

Although the indicators are used during normal operation of the terminal, there is never a condition requiring all four of them to be used at the same time during normal terminal operation. The present invention seizes upon this non-simultaneously use exception and when all four indicators are on simultaneously indicate a unique condition during system bring-up. The turning on and of of the indicators is controlled by the microprocessor 48' from a stored program in the ROS. Details of the process step which have to be done in order to turn on the indicators which signify that the keyboard is ready (that is, functional) will be given in a flow chart subsequently. Suffice it to say at this point that the microprocessor on application of power executes a test program stored in ROS 5a and depending on the outcome of the test the indicators are turned on.

Still referring to FIG. 4, the operator display includes display panel 60 which is coupled by the display control logic means 56 to microprocessor 48. As with the operator keyboard the operator display is controlled by microprocessor 48. A program stored in ROS 50 is executed by the microprocessor and depending on the outcome of the test a series of digits are turned on as assigned devices within the distributive data processing system are proven to be operational and ready for use. To this end the display panel 60 must have the capability of displaying up to 7 numeric digits without requiring an external generator in order to be able to indicate the progress of the bring-up procedure prior to the application program being loaded into the second order control unit.

To this end and for purposes of the bring-up procedure the display panel is provided with a display zone (not shown) having at least 7 display positions arranged in a side by side relationship, each position being capable of displaying a numeric digit. As will be explained subsequently, each numeric digit is assigned to represent the operational state of a device or program loading routine within the system. To this end when the display unit performs its own operational test and is proven to be functional, a 1 is posted in the first position of the display zone. Similarly, all four indicators on the keyboard system indicator panel are turned on when the keyboard checks out to be in a ready state. A "2" is posted in the second position of the indicating zone on the display panel and two indicators are turned off on the keyboard system indicator panel when the first order control unit 30 checks out. A "3" is posted in the third position of the display zone on the display panel when the second order control unit 18 (FIG. 2) checks out. A 4 is posted in the fourth position of the display zone when the third order control unit, i.e., the store control system 14, checks out to be operational.

Positions 5, 6 and 7 of the display zone are reserved for indicating the progress of downloading programs from the store controller 14 into the terminal; with each position being operable to display a similar numeral when the portion of the program to which it is assigned is loaded successfully into the terminal. If a device or sub-assembly fails a bring-up test, it is assumed that the device is defective and the corresponding numeral is not turned on. Likewise, the numeral that is assigned to indicate the state of a program loading routine will not be activated (that is, turned on) if the routine is not successfully completed. Thus, by observing the display, an operator located at the first order control unit can tell the operational state of the entire computing system. Moreover, the operator can identify the sub-system that is failing. It should be noted that instead of using numerals any other type of indicia (such as alphabetic characters) might be used to indicate the operational characteristics of the devices within the system.

It should also be noted that a complete operating system may be used to enable the system to display more complex messages. The messages could be used to indicate the status (failure) of any other I/O devices which may be attached to the system. The microcode necessary to execute all bring-up and display and keyboard functions resides in the ROS associated with each respective microprocessor. The I/O devices are cable attached to their respective control units which supply power and control signals. The exact nature of the control signals is not germane to this invention, only the meaning as interpreted by the devices is important and will be described subsequently.

It should be noted that the availability of two independent display functions (that is, four system LEDs on the keyboard and the display zone at the display panel of the operator display) is an essential part of this invention. It allows the operator to determine whether the display or the control unit is at fault in case the display comes up blank. As the probability of both I/O units (that is, the keyboard and the display) failing at the same time is extremely small, the indicators on the keyboard provide this isolation capability. Correct keyboard indications show a display failure. Incorrect keyboard indications show a control unit failure.

Figure 5:
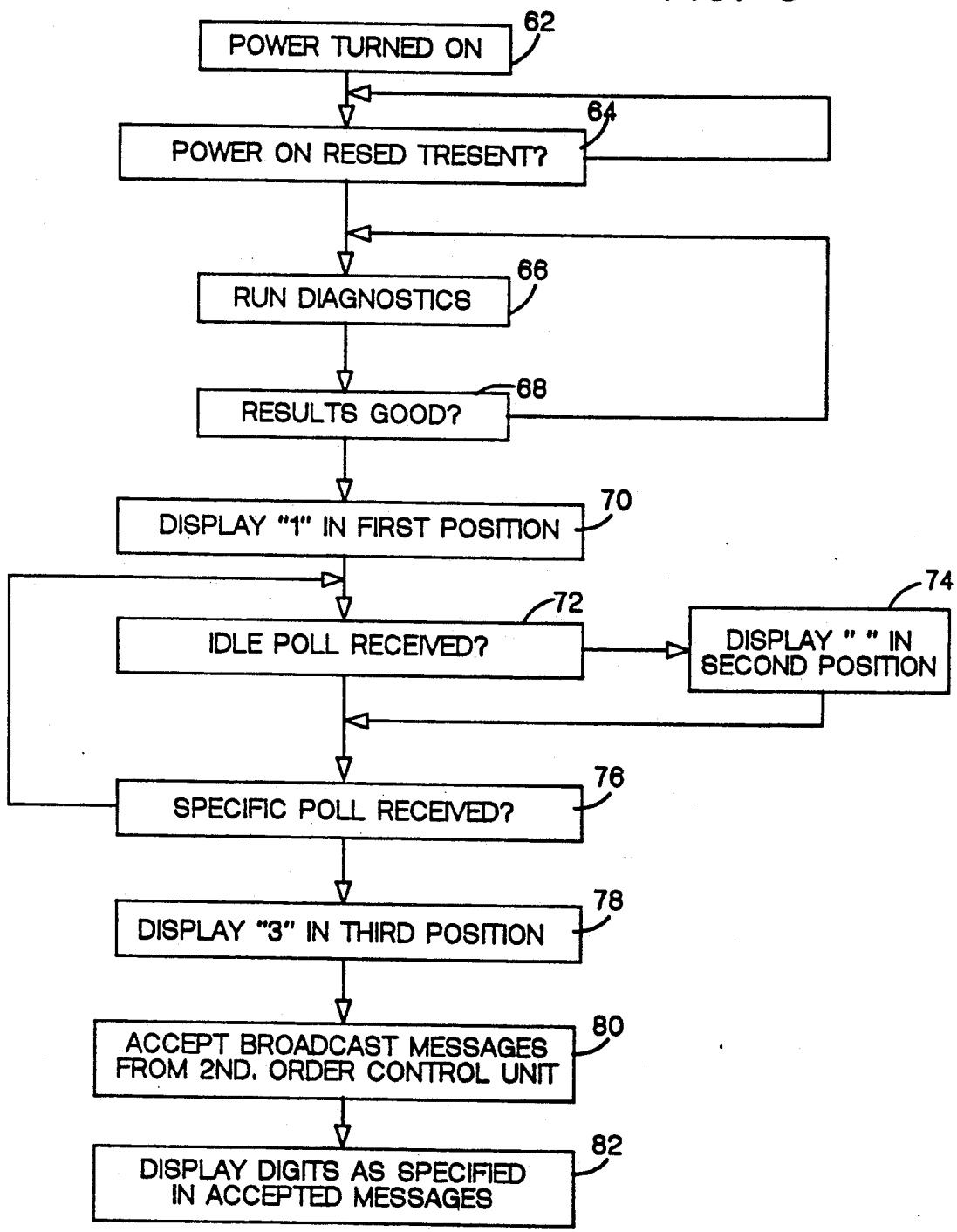
FIG. 5 shows a flow chart for the display "bring-up" routine.

FIG. 5 shows a bring-up routine for the display. This routine is the same for all displays whether the display is connected to the first order control unit or the second order control unit. The first step in the routine is to turn on the power at one of the control unit (block 62). In block 64 the program checks to see if the power on reset pulse is present. As stated previously, this power on reset pulse is outputted from the power supply 32 and 32' on conductors 34 and 34' (FIG. 3) when the power supplies are turned on. If power on reset is present, the program goes into a loop until it is removed. Once it is removed, the program descends into block 66 where it runs a diagnostic program for that display.

From block 66 the program descends into block 68 where it checks to see if the result is good. If the result is not good, the program goes into a loop until the result checks out and it descends into block 70. In block 70 the program posts a logical "1" in the first position of the display zone on the display panel. The program then descends into block 72 where it checks to see if it receives a special message called an "Idle Poll". If the special message has been received, this indicates that the first order control unit 30 (FIG. 3) is ready and a 2 is posted in the second position in the display zone (block 74). From block 74 the program enters block 76. The program also enters block 76 if it did not receive an idle poll. In block 76 the program checks to see if the specific poll is received. It should be noted that a specific poll is a special message that carries the address of the display unit. If the poll is not specific, the program goes into a loop through block 72. If the poll is specific, the program descends into block 78. In block 78 a "3" is displayed in the third position of the display zone. This "3" indicates that the second order control unit (that is, the terminal) is operational. From block 78 the program descends into block 80. In block 80 the program checks to see if a broadcast message is sent from the second order control (CTRL) unit. If it is, the program descends into block 82 where it displays in the appropriate order position of the display zone the number specified in the accepted messages.

Figure 6:
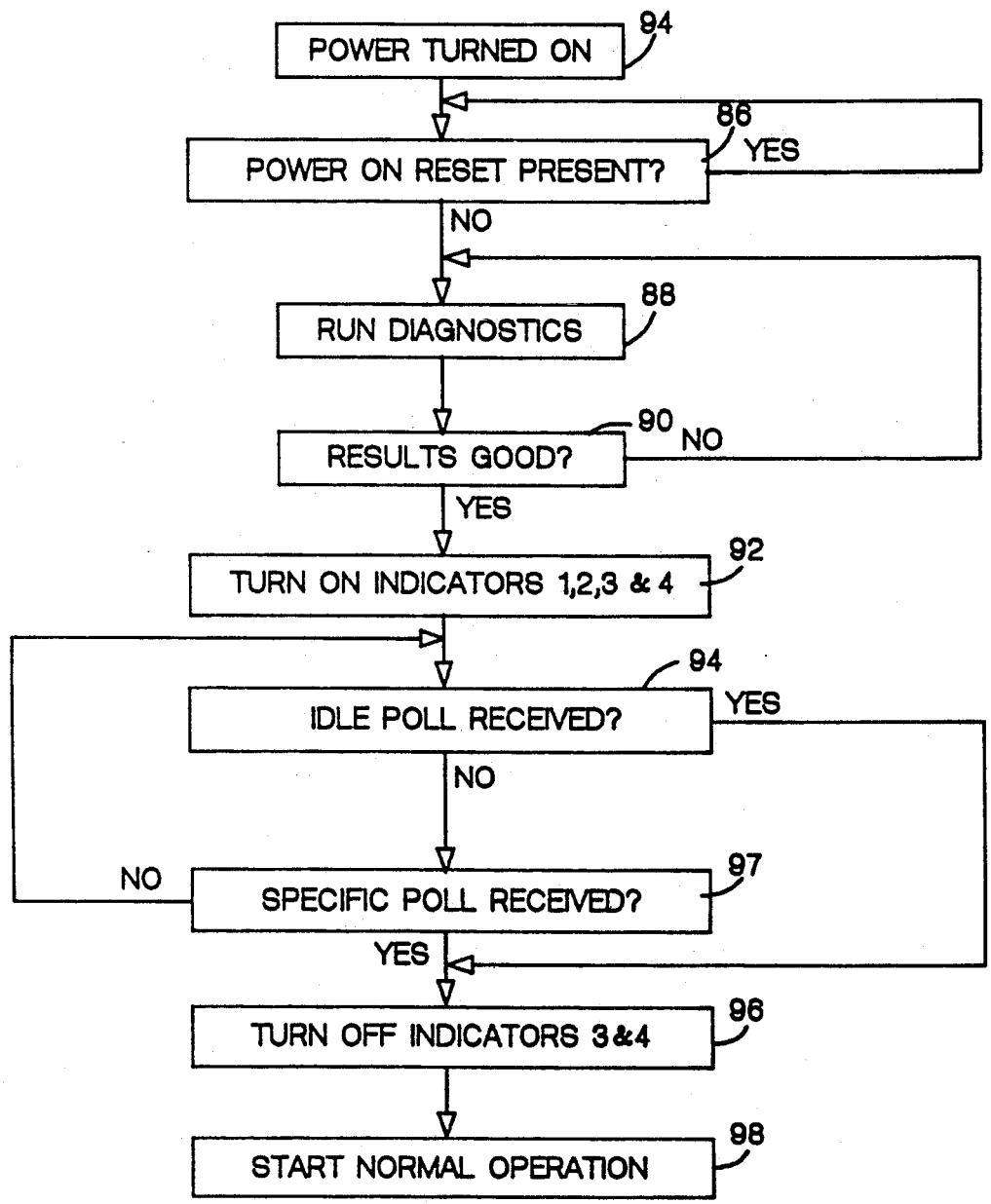
FIG. 6 shows a flow chart for the keyboard "bring-up" routine.

FIG. 6 shows a bring-up routine for the keyboard. As with the display device, a keyboard is cable attached to each of the control unit. The first step in the process is to turn on the power (block 84). With the power turned on, the program descends into block 86. In block 86 the program checks to see if the power on reset pulse is present. If it is, the program goes into a loop and when the pulse goes away, the program descends into block 88 where it runs a series of diagnostic tests for the keyboard.

The program then descends into block 90 where it checks to see if the results are good. If the results are not good, it goes into a loop as is shown in the flow chart. If the result is good, the program descends into block 92. In block 92 the program turns on all the indicators, that is, 1, 2, 3 and 4. As stated above, this is the only condition under which all four indicators on the keyboard will be turned on simultaneously, thereby indicating to the user that the keyboard is operational. The program then descends into block 94 where it checks to see if it receives the special idle poll message. If it has received the idle poll message, the program descends into block 96. If it does not receive the idle poll message, it descends into block 97 where it checks to see if it receives a specific poll message. If it does not receive the specific poll message in block 97, the program loops back into block 94. If the program receives a specific poll, block 97, the program descends into block 96 where it turns off indicators 3 and 4 and descends into block 98 to begin normal operation.

FIG. 7 shows a flow chart for the bring-up procedure used on a first order control unit. As with the other routines, the first step in the routine 100 requires that the power be turned on (block 100). From block 100 the program descends into block 102. In block 102 the program checks to see if the power on reset pulse is present. If it is the program goes into a loop until it goes away and the program descends into block 104. In block 104 the program runs diagnostics for that terminal and then descends into block 106. In block 106 the program checks on the state of the results of the diagnostics that were run in block 104. If the result is not good, the program enters into a loop. If it is good, the program enters into block 108. In block 108 the program transmits a message called "idle polls" to the attached device. The program then descends into block 110 where it transfers all messages and polls from the second order control unit to the devices.

Figure 8A:
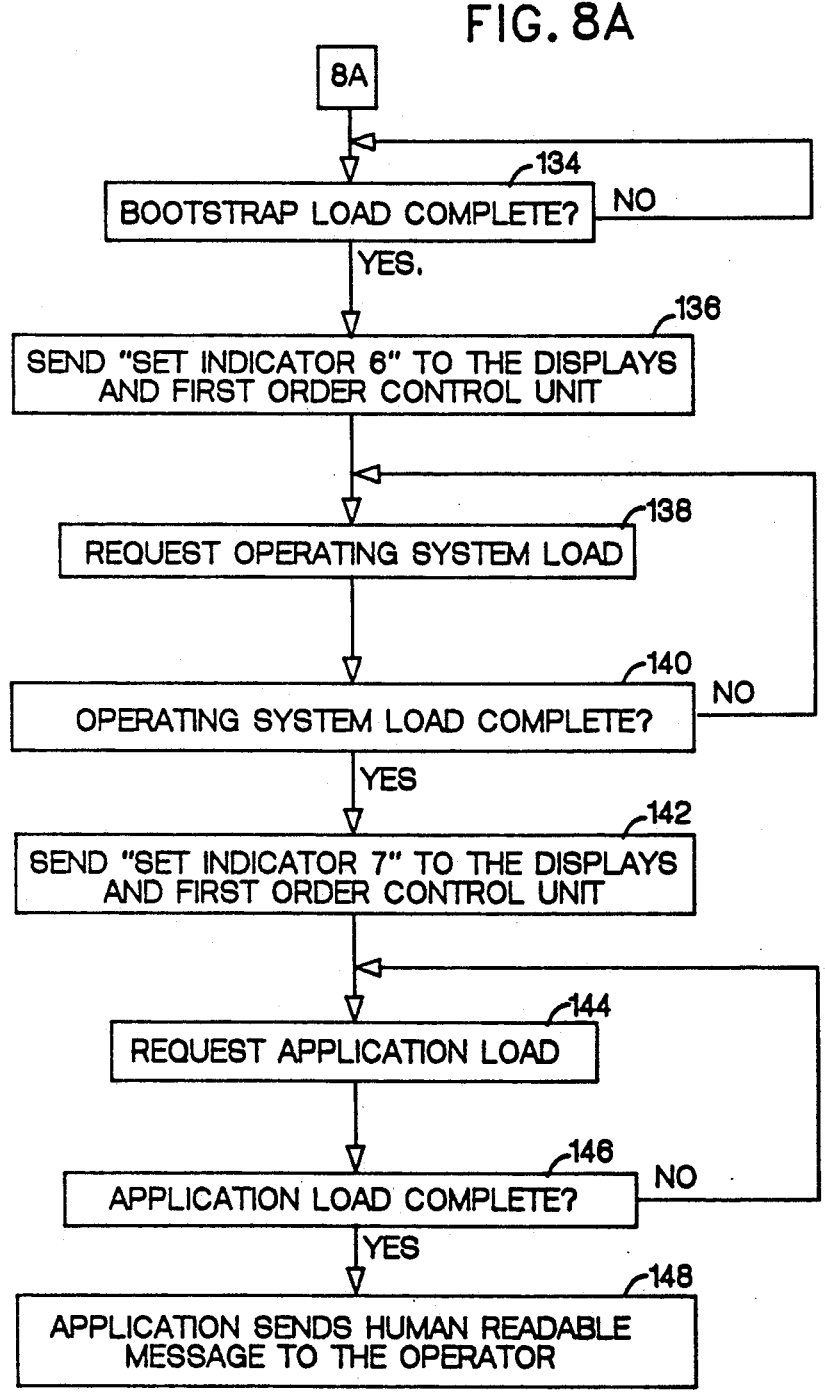

As stated above, the present invention not only indicates the bring-up status of devices and/or sub-systems in the computing system but it also indicates the progress of downloading programs from the store controller 14 into the terminal 10. As an assigned section of the program is downloaded, indicators such as numerals 5-7 of the display zone are displayed or activated. FIGS. 8 and 8A show a flow chart of the bring-up routine for the second order control unit and the turning on of indicia or numerals in display zone position 5-7. The program steps from block 112 through block 118 are self-explanatory. Essentially, the power is turned on at the second order control unit and the unit is tested to see when the power on reset pulse goes away. When it goes away, the program runs diagnostics in the terminal and if the result is good, the first order control unit and the I/O devices that are attached to the second order control unit are polled with their respective specific addresses in said poll message. The program then descends into block 122. In block 122 a loop adapter which attaches the second order unit to the loop (FIG. 1) is enabled. Such adapters for attaching terminals to loop are well known in the art and details will not be given here. The program then descends into block 124 where it tests to see if a specific message called a poll is on the loop. The poll is generated and outputted on the loop by the store controller 14 (FIG. 1). If there is no poll on the loop, the program goes into a loop until a poll is detected and the program then descends into block 126.

In block 126 the program sends "Set Indicator 4" message to its attached display and the first order control unit. The program then descends into block 128. In block 128 the program issues a request bootstrap load. As will be explained subsequently, the program which is to be downloaded from the store controller into the terminal may be classified into three parts; namely, a bootstrap routine, an operating system and application program. The request which the terminal issues in block 128 is to download the first section (that is, the bootstrap routine) of the program. The program then descends into block 130 where it checks to see if the first bootstrap block is received. If it is not received, the program goes into a loop until it is received and then the program descends into block 132. In block 132 the program sends a message including the instruction "set indicator 5" to the display and first order control (CTRL) unit. As a result a "5" is displayed in the fifth position of the indicating zone of the display. The "5" indicates that the third order control unit is capable of communicating over the loop with the second order control units.

The program then descends into block 134 (FIG. 8A). In block 134 the program checks to see if the bootstrap load routine is completed. If it is not, the program goes into a loop until it is completed, then it descends into block 136. In block 136 the program sends a message with set indicator 6 to the display and first order control unit. The program then descends into block 138 where it requests the loading of the operating system. The program then descends into block 140 where it checks to see if the operating system loading is completed. If it is not completed, the program goes into a loop and remains in the loop until the program loading is completed from whence it descends into block 142. As before, it sends a message to the display and the first order control unit causing numeral "7" to be posted or displayed in the last position of the display zone. The program then descends into block 144 where it requests a loading of the application programs. From block 144 the program descends into block 146 where it checks to see if the application programs loading is completed. The programs enters a loop until the application program loading is completed. The program then descends into block 148. In block 148 the application program which has been loaded sends human readable messages to the operator via the display panel.

Figure 9:
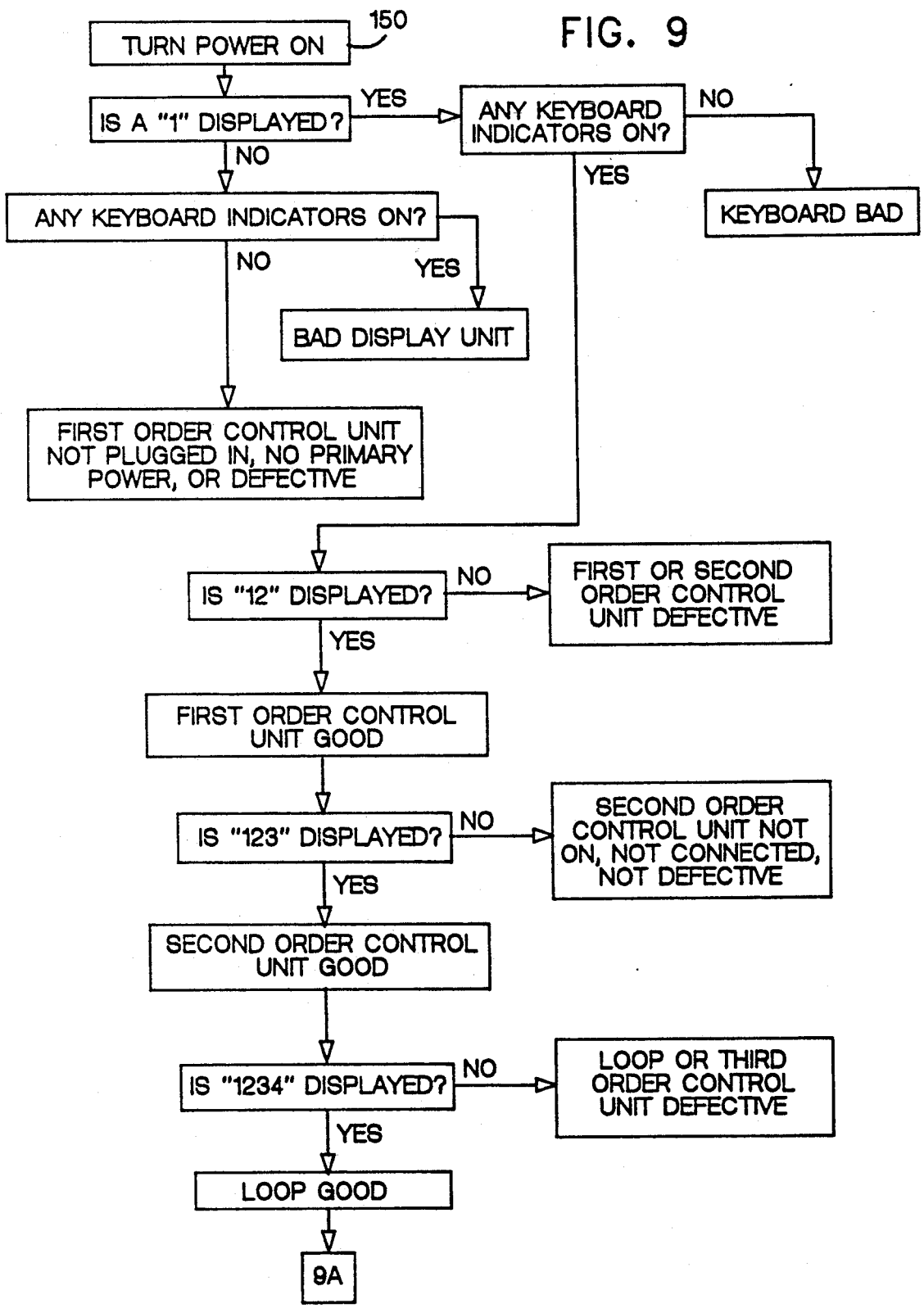
FIGS. 9 and 9A show a decisional chart for guiding an operator.
Figure 9A:
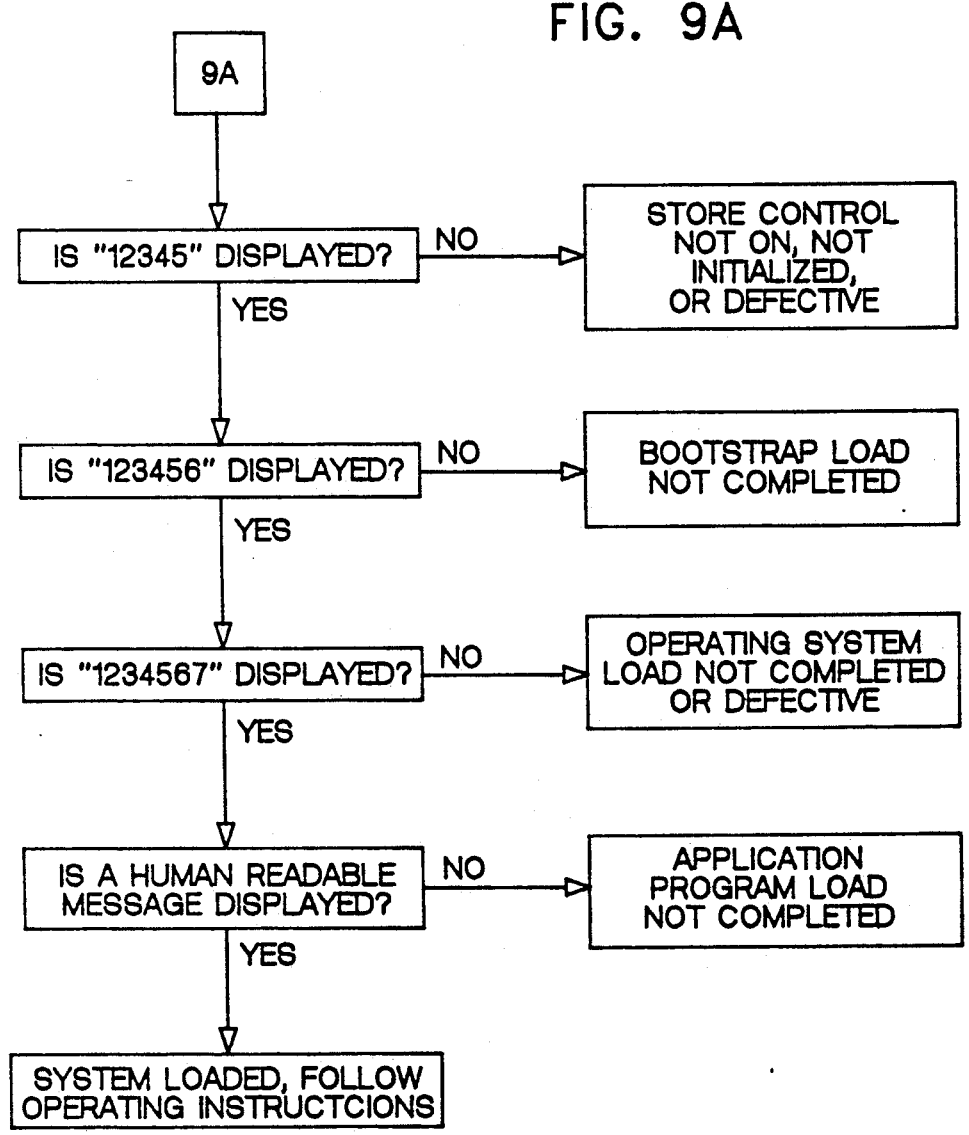

FIGS. 9 and 9A shows an operator decisional chart. By following this chart the operator can determine the meaning of the display messages and also what part of the system is defective. For example, in block 150 the operator must make sure that the power is turned on at each of the terminals. The other steps in the flow chart are self-explanatory and in the interests of brevity a detailed description of each block will not be given.

OPERATION

In order to provide a logical framework within which an operator or user can identify the operability of a unit within the data processing installation, the units are categorized within an hierarchical structure. The structure includes a first order control unit 30 (FIG. 2). The first order control unit is connected to and is driven by a second order control unit 18 (FIG. 2). Both the first and second order control unit have operator-oriented I/O devices (keyboard, display, printer, etc.) attached thereto. The second order control unit in turn attaches to a third order control unit also called a store controller 14 via the store loop 12. The second order control unit is dependent on the third order control unit for its operating system and applications programs. When a store is brought up at initial installation time or any other time thereafter, when all units have been powered down, the order in which they are powered on is not normally controlled. Since all units are not located within sight of each other, it is desirable to provide an operator at the lowest order control unit with an indication of how the store bring-up procedure is progressing. Also, if intervention is required, indicate at what point action is required.

The lowest order devices are a keyboard and display which are individually cable-connected to a first order control element or unit. This element may supply power to the unit and relays signals from the second order control element to control these input/output devices. The first order control element is in turn cable-connected to the second order control unit which generates the control signals for the I/O devices. The second order control element is controlled by a program which must be down loaded from the third order control element to which it is cable connected over a communication line. The three control elements are not necessarily within viewing distance of each other, making it impossible for a user stationed at the first order control element to depend on information display at the high order control elements to determine the functionality of the system.

All components of the system have the capability to check their own functionality up to the point of being able to communicate with the higher order control element. When power is turned on at the first order control element, the display, the keyboard and the first order control element perform their individual bring-up diagnostics. If successfully completed, the display provides an indication of the success by displaying the digit "1" in the first order position of the display zone and the keyboard by lighting one or more indicators provided for this purpose. In the preferred embodiment of the invention all four indicators are lighted.

If neither the display nor the keyboard display (that is, the indicators) shows the expected results, the first order control unit with its associated power supply is presumed to be defective as the probability of both keyboard and the display being defective at the same time is extremely low. If only one of the two devices fails to display the proper result, the device in question is considered defective. In other words, the device that fails to display what it should have displayed is assumed to be inoperative. Since the power supply located in the first order control unit must be functional in order for the control unit and the associated I/O devices to work, providing a separate bring-up test routine both on the keyboard and the display resolves any ambiguity. Next, if the first order control unit successfully completes its bring-up diagnostics procedures, it sends a control signal or message to the display, causing the digit "2" to be displayed in the second position. If the digit "2" is not displayed in the second order position of the display zone, the control unit is presumed to be defective. If the display indicates a "2", the first order control unit is considered to be functional and able to communicate with the second order control unit which is relied on to provide all further signals to the display zone.

The second order control unit also has cable-attached keyboard and display to provide the same indications as the keyboard and display attached to the first order control unit. When it is powered on, the control unit performs a bring-up diagnostic test and upon successful completion, transmits a control signal to the display of the first order control unit and its own display, causing both to display the digit "3" in the third order position. If a "3" is not displayed, the user at the first order control unit knows that the second order control unit is either not powered on or requires repair. The user now should take appropriate action (such as those set forth in FIGS. 9 and 9A). If a "3" is displayed in the third order position, the second order control unit is presumed to be functional and able to communicate with the third order control unit to receive its program load.

The third order control unit, when powered on, also performs a series of diagnostics and provides its operator with the evidence of failure or successful completion. If the bring-up diagnostic tests are successful, the third order control unit transmits a signal (called a poll) to the second order control unit. When the second order control unit recognizes this signal, it in turn transmits a signal to its own display and the display attached to the first order control unit, causing a "4" to be displayed in the fourth order position of the display zones. This is an indication that the second order control unit is able to communicate with the third order control unit. The second order control unit then transmits a signal to the third order control unit, requesting it to send a program load. A program may consist of several parts including (a) bootstrap routine, (b) operating system, and (c) application program. Indications may be provided of the progress of the program load routine such that if a problem arises prior to its completion the user can determine during which portion of the program loading routine the problem occurred and determine what action may be required to correct the condition. When the first block of the bootstrap routine is received by the second order control unit, it sends a message to its own display and the display attached to the first order control unit, causing both to display a "5" in the fifth order position of the display zone. After the bootstrap routine is loaded into the second order control unit, it transmits a signal to its own display and the display attached to the first order control unit, causing both to display a "6". After the bootstrap routine, the third order control unit transmits the operating system to be loaded by the second order control unit, using the bootstrap routine. When the operating system is loaded, the second order unit sends a signal to its own display and the display attached to the first order control unit causing them to display "7" in the seventh order position. After the operating system is received, the third order control unit transmits the application program to the second order control unit. After the operating system is loaded, the second order control unit is fully functional and is able to prompt the user by displaying human readable guidance messages in country languages on the displays at the first and second order control units.

While the invention has been particularly shown and described with reference to the preferred embodiments thereof, it will be understood by those skilled in the art that various changes in form and details may be made therein without departing from the spirit and scope of the invention.

Having thus described our invention, what we claim as new and desire to secure as Letters Patent is as follows:

1. A method for testing and indicating the operability of a distributive data processing system having a plurality of main terminal units interconnected by a loop communications media to a master control unit and each main terminal unit further including a satellite terminal unit, a keyboard unit, a display unit and a printer unit said method comprising the steps of:
   (a) providing at each display unit a visual indicating means having a display zone with multiple activatable indicia being configured into a predetermined geometrical pattern with the position and the electrical state of each indicium indicating the state of readiness for an assigned unit within said data processing system;
   (b) providing at each unit one or more programmable diagnostic routines for testing the operability of the unit;
   (c) generating in each main terminal unit a power-on-reset pulse for activating the diagnostic routines;
   (d) receiving the power-on reset pulse in the diagnostic routines and executing the diagnostic routines;
   (e) for each unit that completes a successful test, generating and transmitting to the visual indicating means a message including information which identifies an indicium which is to be activated in the set of activatable indicia; and
   (f) receiving the message at the visual indicating means and using the information therein to illuminate only those indicia representing units completing successful tests whereupon non-illuminated indicia represent inoperable units and illuminated indicia representing operable units.

2. The method set forth in claim 1 wherein the indicia of step (f) are being energized in an ascending order beginning with the low order indicia representing a keyboard unit.

3. The method set forth in claim 1 wherein the activatable indicia are being arranged in a linear geometrical pattern.

4. The method set forth in claim 3 wherein the activatable indicia includes numerical characters arranged in an ascending order.

5. The method set forth in claim 4 further including the steps of executing a programmable diagnostic routine in the visual indicating means; and
   illuminating a numerical character located in a first position of the linear geometric pattern only if the diagnostic routine is completed successfully.

6. In a distribution data processing system having a plurality of independent control units connected to a plurality of I/O devices and a loop communications media interconnecting the control units an improved method for testing the operability of units within said system and displaying the result of said test to an operator comprising the steps of:
   (a) categorizing the independent control units within different levels of an hierarchical structure;
   (b) attaching at least a keyboard unit and a display unit to each independent control unit within a designated category;
   (c) providing a display zone at each keyboard unit and at each display unit, respectively, said display zone containing a plurality of linearly spaced indicia with each indicium assigned to indicate the operational state of an assigned unit within said distributive data processing system;
   (d) executing at each unit a test for checking the operability of the unit;
   (e) for each unit completing a successful test, generating and transmitting to said display unit a message including information identifying an indicium to be activated; and
   (f) receiving the message at the display unit and using the information to illuminate only indicium representing units which complete the test satisfactorily.

7. The method set forth in claim 6 further including the steps of concatenating a second group of linearly spaced indicia to the plurality of linearly spaced indicia of step (c) with each indicium in the second group of linearly spaced indicia assigned to indicate a status of a program transfer within said system;

transferring programs between control units located in different levels of the hierarchical structure;

upon a successful transfer of a program, a recipient control unit generates and transmits to the display unit a message with information indicating an indicium which is to be activated in said second group;

receiving the message at the display unit and using its contents to illuminate the indicium assigned to indicate the status of the program transfer only if said program transfer is completed successfully.

* * * * *